United States Patent
Varanasi et al.

(10) Patent No.: US 6,733,889 B2
(45) Date of Patent: May 11, 2004

(54) REFLECTIVE, SOLAR CONTROL COATED GLASS ARTICLE

(75) Inventors: Srikanth K. Varanasi, Toledo, OH (US); Michael P. Remington, Jr., Toledo, OH (US); David Strickler, Southport (GB)

(73) Assignee: Pilkington North America, Inc., Toledo, OH (US)

( * ) Notice: Subject to any disclaimer, the term of this patent is extended or adjusted under 35 U.S.C. 154(b) by 0 days.

(21) Appl. No.: 10/145,344

(22) Filed: May 14, 2002

(65) Prior Publication Data

US 2003/0215648 A1 Nov. 20, 2003

(51) Int. Cl.[7] ................................................. B32B 17/00
(52) U.S. Cl. ...................... 428/426; 428/336; 428/432; 428/697; 428/701; 428/702
(58) Field of Search ................................ 428/426, 428, 428/432, 689, 697, 701, 702, 336

(56) References Cited

U.S. PATENT DOCUMENTS

| | | | |
|---|---|---|---|
| 4,144,684 A | * | 3/1979 | Kirkbride et al. .......... 52/204.5 |
| 4,187,336 A | | 2/1980 | Gordon |
| 4,206,252 A | | 6/1980 | Gordon |
| 4,419,386 A | | 12/1983 | Gordon |
| 5,698,262 A | | 12/1997 | Soubeyrand et al. |
| 5,750,265 A | * | 5/1998 | Goodman .................... 428/432 |
| 5,773,086 A | | 6/1998 | McCurdy et al. |
| 5,780,149 A | | 7/1998 | McCurdy et al. |
| 5,965,246 A | * | 10/1999 | Guiselin et al. ............. 428/212 |
| 6,048,621 A | * | 4/2000 | Gallego et al. .............. 428/432 |
| 6,218,018 B1 | * | 4/2001 | McKown et al. ............ 428/432 |
| 6,231,971 B1 | * | 5/2001 | Terneu et al. ................ 428/336 |
| 6,238,738 B1 | | 5/2001 | McCurdy |
| 6,447,921 B1 | * | 9/2002 | Norimatsu et al. .......... 428/432 |

FOREIGN PATENT DOCUMENTS

| | | |
|---|---|---|
| EP | 1048627 A2 | 4/2000 |
| EP | 1057796 | 5/2000 |
| WO | WO97/10186 | 3/1997 |

* cited by examiner

*Primary Examiner*—Stephen Stein
(74) *Attorney, Agent, or Firm*—Marshall & Melhorn, LLC.

(57) ABSTRACT

A coated glass article is formed having a glass substrate and at least first and second coatings deposited over the glass substrate. The first coating is a low emissivity layer having a first refractive index. The second coating is a reflecting layer having a second refractive index greater than the first refractive index of the first coating. The coated glass—article exhibits an Rf>15% and an emissivity less than or equal to about 0.3.

33 Claims, 1 Drawing Sheet

REFLECTIVE, SOLAR CONTROL COATED GLASS ARTICLE

BACKGROUND OF THE INVENTION

The invention relates to coated glass and, in particular, to visible light reflecting, solar control coated glass articles.

Coatings on architectural glass are commonly utilized to provide specific energy absorption and light transmittance properties. Additionally, coatings provide desired reflective or spectral properties that are aesthetically pleasing. The coated articles are often used singularly or in combination with other coated articles to form a glazing or window unit.

Coated glass articles are typically produced "on-line" by continuously coating a glass substrate while it is being manufactured in a process known in the art as the "float glass process." Additionally, coated glass articles are produced "off-line" through a sputtering process. The former process involves casting glass onto a molten tin bath which is suitably enclosed, thereafter transferring the glass, after it is sufficiently cooled, to lift out rolls which are aligned with the bath, and finally cooling the glass as it advances across the rolls, initially through a lehr and thereafter while exposed to the ambient atmosphere. A non-oxidizing atmosphere is maintained in the float portion of the process, while the glass is in contact with the molten tin bath, to prevent oxidation of tin. An oxidizing atmosphere is maintained in the lehr. In general, the coatings are applied onto the glass substrate in the float bath of the float bath process. However, coatings may also be applied onto the substrate in the lehr.

The attributes of the resulting coated glass substrate are dependent upon the specific coatings applied during the float glass process or an off-line sputtering process. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

There is an increasing demand for solar control glasses, especially high performance solar control glasses that exhibit a neutral color in both reflection and transmission. "High performance" solar control glasses means glasses that transmit a significantly higher percentage of incident light than of total incident radiation energy (total solar heat).

It would be advantageous to provide a coated stack for a glass article that is itself color neutral, so that for the coated glass article, the reflected color from the film side is neutral, and transmitted color remains substantially unchanged from that of the selected base glass. A visible light reflecting, solar control glazing with a low emittance, and a low solar heat gain coefficient, would significantly improve energy costs in buildings and homes while providing a desirable neutral color for, at least, film side reflection. The low emittance characteristic of the glazing would minimize any indirect heat gain from absorption.

SUMMARY OF THE INVENTION

According to the invention there is provided a visible light reflecting, solar control article comprising a glass substrate, a first coating deposited over the glass substrate and a second coating deposited over the first coating. The first coating is comprised of a doped metal oxide, and in an especially preferred embodiment is comprised of fluorine doped tin oxide. The first coating provides the low emissivity of the coated glass article.

The second coating is comprised of a transparent metal oxide having a refractive index greater than the refractive index of the first coating. The addition of the second coating increases the visible light reflectance of the coated glass article, so that the resulting coated glass article has a film side reflectance Rf>15% and an emissivity less than or equal to about 0.3.

Preferably, the coated glass article includes an iridescence-suppressing interlayer deposited between the glass substrate and the first coating of the doped metal oxide. The coatings are such as to provide a neutral color in transmittance and reflectance when applied to a clear glass substrate.

DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

Figure 1:
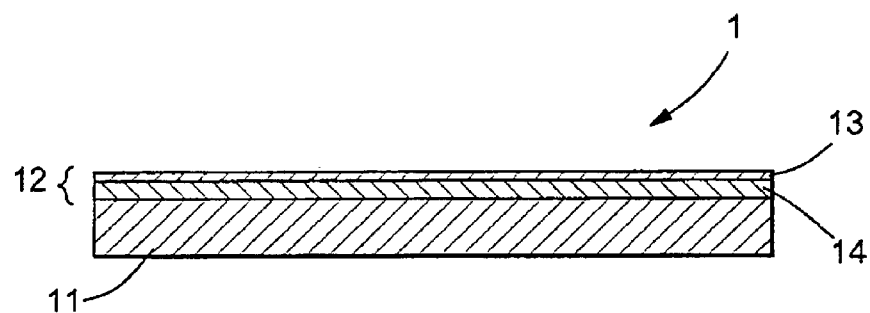
FIG. 1 is a sectional view through a coated glass article in accordance with one embodiment of the invention.

Referring to FIG. 1, a visible light reflecting, solar control coated glass article 1 comprises a glass substrate 11 and a multi-layer coating 12 including a low emissivity layer 14 and a reflecting layer 13.

Figure 2:
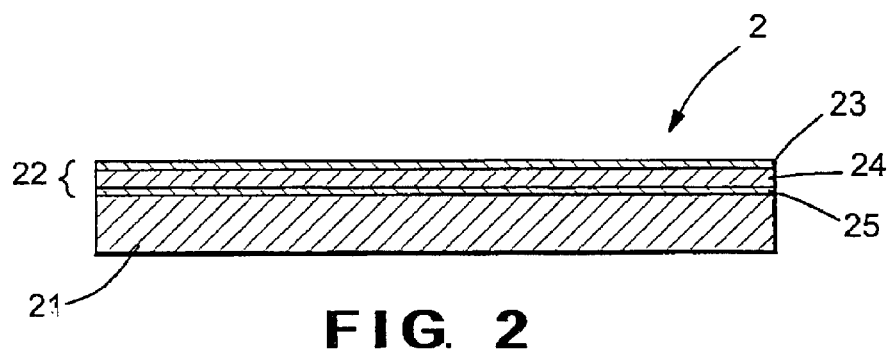
FIG. 2 is a sectional view through a coated glass article in accordance with a second preferred embodiment of the invention.

The embodiment shown in FIG. 2 is similar to the embodiment of FIG. 1, with a coated glass article 2 comprising a glass substrate 21 and a multi-layer coating 22. However, coating 22 differs from coating 12 in that it comprises, in addition to low emissivity layer 24 and reflecting layer 23, an iridescence suppressing underlayer 25 as further discussed hereinafter.

Figure 3:
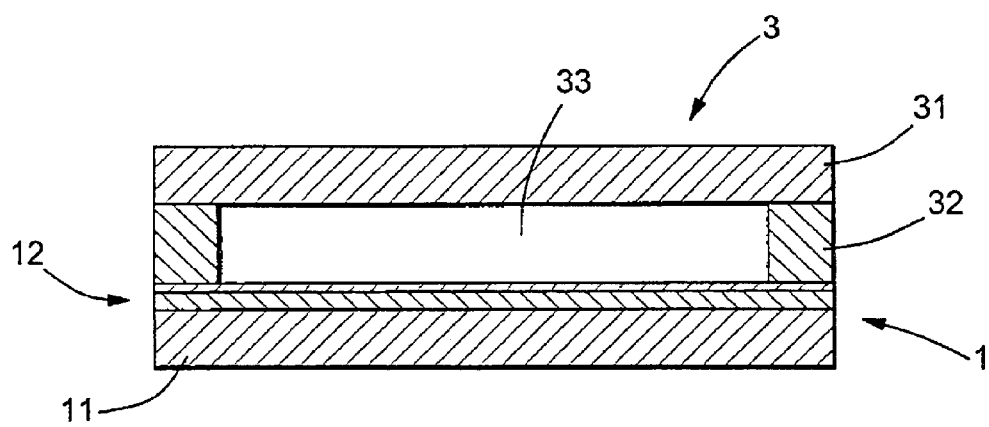
FIG. 3 is sectional view through a double glazing unit incorporating a coated glass article as illustrated in FIG. 1.

FIG. 3 illustrates the coated glass pane 1 of FIG. 1 assembled in parallel spaced apart relationship with a second pane of glazing material 31, typically of clear float glass, the panes being spaced apart and sealed together by spacing and sealing system 32, to form double glazing unit 3 having airspace 33. The coating 12 faces the airspace 33 of the unit, with the coating facing towards the interior of the glazed space (usually, but not necessarily, a building). The second pane of glazing material 31 may, in certain preferred embodiments, be provided with a low emissivity layer (not shown) facing towards the airspace 33.

The glass substrates suitable for use in preparing the coated glass article according to the present invention may include any of the conventional glass compositions known in the art as useful for the preparation of architectural glazings. The preferred substrate is a tinted float glass ribbon wherein the coatings of the present invention are applied in the heated zone of the float glass process. Additionally, clear glass substrates may be suitable for applying the multilayered stack of the invention. However, the tinted glass substrates are especially preferred for their impact on the spectral and energy transmittance properties of the coated glass article.

The low emissivity layer is a layer of a metal compound, normally a metal oxide (as other low emissivity compounds such as metal nitrides and metal silicides tend to have lower light transmissions), and a transparent semiconductor, for example, a doped indium, tin or zinc oxide. Preferred materials include tin doped indium oxide and fluorine doped tin oxide, with fluorine doped tin oxide being especially preferred. The low emissivity layer will normally have a thickness in the range 1000 Å to 6000 Å (as use of a thicker layer is likely to result in an unnecessary reduction in light transmission without sufficient reduction in emissivity to compensate), especially a thickness in the range 2000 Å to 5000 Å. The low emissivity layer provides an emissivity of less than 0.3 (the numerical values of emissivity referred to in this description and the accompanying claims are values of hemispherical emissivity (Eh)), although it is preferred to use a low emissivity layer which provides an emissivity of 0.2 or less.

The reflecting layer is deposited over the low emissivity layer in the coated glass article of the invention. The reflecting layer has a refractive index in the visible spectrum that is greater than the refractive index of the low emissivity layer. The refractive index of the reflecting layer will generally be greater than or equal to about 2.0. The reflecting layer is normally a layer of a transparent metal oxide, such as oxides of titanium, zirconium or chromium. An oxide of titanium is an especially preferred material for forming the reflecting layer of the coated glass article.

Titanium oxide coatings formed by atmospheric pressure chemical vapor deposition, such as those described in U.S. Pat. No. 6,238,738, which is incorporated herein by reference, are known to be photocatalytic and hydrophilic. Thus, use of the coating stack of the invention on an exterior-facing surface of a glazing will result in so-called "self-cleaning" properties. Of course, use of the coating stack of the invention on the exterior-facing surface of an insulated glass unit will negatively impact the solar control properties relative to use of the same coating stack on an unexposed surface of a pane of an insulating glass unit.

Use of thin films, as in the present invention, may result in the appearance of interference colors and iridescence. To avoid, or at least alleviate, undesirable color resulting from interference effects, a color suppressing underlayer (which may itself be a combination of sub-layers) may be applied to the glass prior to deposition of the low emissivity and reflecting layers. Iridescence-suppressing coatings are conventionally known within the art. For example, U.S. Pat. Nos. 4,187,336; 4,419,386; and 4,206,252, herein incorporated by reference, describe coating techniques suitable for suppressing interference colors. The interlayer of the present invention may comprise a single iridescence-suppressing coating, a two-layer coating, or a gradient coating. Thus, according to a preferred aspect of the invention, an iridescence suppressing layer or layers is incorporated under the coating comprising a low emissivity layer and reflecting layer.

The low emissivity layer and reflecting layer of the present invention may be deposited by known techniques, for example, by sputtering, including reactive sputtering, or by chemical vapor deposition. Indeed, it is an important advantage of the invention that both the above layers are susceptible to deposition by chemical vapor deposition techniques providing for the possibility of applying the coating to the hot ribbon of glass during the glass production process. Methods of depositing metal oxides by chemical vapor deposition are described, for example, in U.S. Pat. Nos. 5,698,262; 5,773,086 and 6,238,738, each of which is incorporated by reference herein.

The invention is illustrated but not limited by the following Examples. In the Examples, as in the remainder of the description and claims, Tvis represents the visible light transmission measured using Illuminant C on a Perkin-Elmer Lambda 19 spectrophotometer. The total solar heat transmissions (Tsol) stated are determined by weighting with a solar spectral irradiance function (ASTM E891-87) that represents the direct normal radiation incident on a surface (air mass 1.5). The Rg and Rf are the total visible light reflectances measured from the glass and film sides respectively. These reflectances were measured using a Colorsphere spectrophotometer available from BYK Gardner Scientific. SHGC is the solar heat gain coefficient and SC is the shading coefficient. The winter time U values and summer time U values are denoted as Uwin and Usum respectively. The color of light transmitted and reflected from the film side of the coated glass articles is measured according to the CIELAB color scale coordinates of $a^*$ and $b^*$.

EXAMPLES 1–3

The multi-layer coating stacks of Examples 1–3 were deposited by chemical vapor deposition on a clear float glass ribbon during the float glass production process. The glass was 3–3.2 mm in thickness. An iridescence-suppressing interlayer was first deposited onto the surface of the glass substrate in the heated zone of a float glass production process. The iridescence-suppressing layer included a tin oxide coating deposited on and adhered to the glass substrate. The tin oxide was applied by chemical vapor deposition in the heated zone of the float glass process by introducing dimethyl tin dichloride in an oxidizing atmosphere over the surface of the substrate. A silicon dioxide coating was then applied onto the surface of the tin oxide coating by reacting silane, in the presence of oxygen and ethylene, near the surface of the substrate in the heated zone of the float process.

A fluorine doped tin oxide coating was deposited onto the surface of the silicon dioxide coating. The fluorine doped tin oxide coating was deposited by chemical vapor deposition in the heated zone of the float glass process by introducing dimethyl tin dichloride, water and hydrogen fluoride in an oxidizing atmosphere over the surface of the substrate.

A titanium dioxide coating was deposited onto the surface of the fluorine doped tin oxide coating. The titanium dioxide coating was also deposited by chemical vapor deposition in the heated zone of the float glass process by introducing titanium tetrachloride and an organic oxygen source over the surface of the substrate, as described in U.S. Pat. No. 6,238,738.

The layer thicknesses in Angstroms, measured optically, and the properties of the resulting coated glass articles are shown below in Table 1. In each case, the haze was less than 1.0%.

TABLE 1

| Ex. | SnO$_2$ | SiO$_2$ | SnO$_2$:F | TiO$_2$ | Tvis | Rf | Eh | T a* | T b* | Rf a* | Rf b* |
|---|---|---|---|---|---|---|---|---|---|---|---|
| 1 | 269 | 227 | 2325 | 320 | 71.01 | 22.8 | .21 | 0.97 | 5.09 | −5.5 | −4.6 |
| 2 | 280 | 182 | 2064 | 502 | 66.96 | 27.2 | .25 | 1.63 | 3.18 | −6.1 | −1.0 |
| 3 | 291 | 210 | 2738 | 302 | 76.18 | 17.0 | .18 | −1.92 | 5.78 | 2.0 | −7.9 |

EXAMPLES 4–15

A coated glass article was produced in accordance with Examples 1–3 having the following layer thicknesses: 271 Å SnO$_2$, 172 Å SiO$_2$, 2100 Å SnO$_2$:F, and 300 Å TiO$_2$. The Eh of the sample was measured to be 0.22. Properties were then calculated for this coating stack on various glass substrates, clear and a variety of tints, having a thickness of ¼ inch. These examples are numbered 4–9 and are shown below in Table 2.

Properties were also calculated for the same coated glass articles of Examples 4–9 as utilized as the outboard light in an insulated glass unit with the coating stack facing the interior of the structure. A ¼ inch thick clear glass sheet was used as the inboard light of the insulated glass unit and positioned at ½ inch from the coated article. These examples are numbered 10–15 and are shown below in Table 3.

TABLE 2

(Monolithic)

| Example | Tvis | Tsol | Rg | Rf | SHGC | SC | Uwin | Usum |
|---|---|---|---|---|---|---|---|---|
| 4 | 66.9 | 57.2 | 23.9 | 26.0 | 0.61 | 0.71 | 0.76 | 0.68 |
| 5 | 41.8 | 25.3 | 13.1 | 22.6 | 0.38 | 0.44 | 0.77 | 0.75 |
| 6 | 56.9 | 35.8 | 20.1 | 22.3 | 0.45 | 0.53 | 0.76 | 0.73 |
| 7 | 41.1 | 36.7 | 12.3 | 22.6 | 0.47 | 0.54 | 0.76 | 073 |
| 8 | 50.1 | 24.5 | 16.7 | 23.0 | 0.37 | 0.43 | 0.77 | 0.75 |
| 9 | 33.4 | 30.7 | 9.8 | 22.3 | 0.42 | 0.49 | 0.76 | 0.75 |

TABLE 3

(IG Unit)

| Example | Tvis | Tsol | Rg | Rf | SHGC | SC | Uwin | Usum |
|---|---|---|---|---|---|---|---|---|
| 10 | 60.3 | 45.5 | 27.6 | 28.8 | 0.54 | 0.63 | 0.35 | 0.38 |
| 11 | 37.6 | 21.1 | 14.6 | 26.1 | 0.30 | 0.34 | 0.35 | 0.40 |
| 12 | 51.2 | 29.5 | 22.8 | 26.6 | 0.38 | 0.44 | 0.34 | 0.39 |
| 13 | 36.9 | 29.1 | 13.7 | 26 | 0.38 | 0.45 | 0.35 | 0.39 |
| 14 | 45.0 | 20.7 | 18.8 | 26.3 | 0.29 | 0.34 | 0.35 | 0.40 |
| 15 | 30.0 | 24.4 | 10.7 | 25.8 | 0.34 | 0.39 | 0.35 | 0.40 |

The glasses used in the above examples are all commercially available from Pilkington North America, Inc. of Toledo, Ohio. Examples 4 and 10 are on clear glass; examples 5 and 11 are on a blue glass sold under the trademark Arctic Blue™; examples 6 and 12 are on blue-green glass; examples 7 and 13 are on bronze glass; examples 8 and 14 are on a green glass sold under the trademark Evergreen™; and examples 9 and 15 are on grey glass.

The coatings of the present invention offer important advantages over the prior art. Being suitable for production by pyrolytic methods (which have the added benefit of lending themselves to application on-line) they can be obtained in highly durable form, reducing the need for special care in handling and processing and opening up the possibility of using the coatings in free standing glazing without the need to protect them within multiple glazing units.

Moreover, excellent performance may be achieved, with coated glass articles having an emissivity less than or equal to about 0.3 and preferably less than or equal to about 0.2, and an Rf of 15% or more, preferably 18% or more, and most preferably 20% or more. When deposited on a suitable tinted glass, the resulting coated glass articles have an SHGC of 0.5 or less, preferably 0.45 or less.

The preferred coated glasses of the present invention are glasses wherein the coating is such as to exhibit reflection (when viewed from the coated side) and transmission (when applied to clear float glass) colors such that $(a^{*2}+b^{*2})^{1/2}$ is less than 12, especially less than 10. In especially preferred embodiments, the reflection and transmission colors are each such that $(a^{*2}+b^{*2})^{1/2}$ is less than 7.

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed:

1. A coated glass substrate comprising:
    a) a glass substrate;
    b) a first coating deposited over the glass substrate, the first coating comprising a low emissivity layer having a thickness in the range of 1000 Å to 6000 Å and having a first refractive index in the visible spectrum; and
    c) a second coating deposited over the first coating, the second coating comprising a visible light reflecting layer and having a second refractive index in the visible spectrum greater than the first refractive index of the first coating;
    the coated glass substrate having an Rf>15%, 30%≦Tvis≦70% and an emissivity less than or equal to about 0.3.
2. The coated glass substrate of claim 1, wherein the glass substrate is comprised of a sheet of tinted glass.
3. The coated glass substrate of claim 2, wherein the SHGC is less than or equal to 0.5.
4. The coated glass substrate of claim 2, wherein the SHGC is less than or equal to 0.45.
5. The coated glass substrate of claim 1, wherein Rf>18%.
6. The coated glass substrate of claim 1, wherein Rf>20%.
7. The coated glass substrate of claim 1, wherein the emissivity is less than or equal to about 0.2.
8. The coated glass substrate of claim 1 wherein the low emissivity layer comprises a doped metal oxide.
9. The coated glass substrate of claim 8 wherein the doped metal oxide comprises a doped tin oxide.
10. The coated glass substrate of claim 9 wherein the doped tin oxide comprises fluorine doped tin oxide.
11. The coated glass substrate of claim 1 wherein the reflecting layer is comprised of a metal oxide.
12. The coated glass substrate of claim 11 wherein the metal oxide is comprised of an oxide of titanium.
13. The coated glass substrate of claim 12, wherein said oxide of titanium provides the coated glass article with a photocatalytic, hydrophilic surface.

14. The coated glass substrate of claim 12, wherein the coated glass article forms part of a glazing and the first and second coatings are deposited on an exterior-facing surface of the glazing.

15. The coated glass substrate of claim 1, further comprising a color suppression layer or layers deposited between the glass substrate and the first coating.

16. The coated glass substrate of claim 1, wherein the coated glass article forms one of the panes of an insulated glazing unit.

17. The coated glass substrate of claim 16, wherein the first and second coatings of the coated glass article are deposited on a surface of the coated glass article that faces another pane of the insulating glass unit.

18. The coated glass substrate of claim 1, wherein the first and second coatings are formed pyrolytically.

19. The coated glass substrate of claim 18, wherein the first and second coatings are formed by chemical vapor deposition.

20. A coated glass substrate according to claim 1, wherein the coating is such as to exhibit reflection, when viewed from the coated side, or transmission, when applied to clear float glass, colors which are each such that $(a^{*2}+b^{*2})^{1/2}$ is less than 12.

21. A coated glass substrate according to claim 20, wherein the coating is such as to exhibit reflection, when viewed from the coated side, or transmission, when applied to clear float glass, colors such that $(a^{*2}+b^{*2})^{1/2}$ is less than 7.

22. A coated glass article comprising:
  a) a glass substrate;
  b) a first coating comprised of fluorine doped tin oxide deposited over the glass substrate, said first coating having a thickness in the range of 1000 Å to 6000 Å and having a first refractive index; and
  c) a second coating comprised of an oxide of titanium deposited over the first coating, the second coating having a second refractive index greater than the first refractive index of the first coating;
  the coated glass article having an Rf>15%, 30%≦Tvis≦70% and an emissivity less than or equal to about 0.3.

23. The coated glass article of claim 22, wherein the glass substrate is comprised of a sheet of tinted glass.

24. The coated glass article of claim 23, wherein the SHGC is less than or equal to 0.5.

25. The coated glass article of claim 23, wherein the SHGC is less than or equal to 0.45.

26. The coated glass article of claim 22, wherein Rf>18%.

27. The coated glass article of claim 22, wherein Rf>20%.

28. The coated glass article of claim 22, wherein the emissivity is less than or equal to about 0.2.

29. The coated glass article of claim 22, wherein said oxide of titanium provides the coated glass article with a photocatalytic, hydrophilic surface.

30. The coated glass article of claim 29 incorporated into a glazing so that the surface of the glass substrate on which the first and second coatings have been deposited is exterior-facing.

31. The coated glass article of claim 22, further comprising a color suppression layer or layers deposited between the glass substrate and the first coating.

32. The coated glass substrate of claim 1, wherein the first coating has a thickness in the range of 2000 Å to 5000 Å.

33. The coated glass article of claim 22, wherein the first coating has a thickness in the range of 2000 Å to 5000 Å.

* * * * *